United States Patent [19]
Nakaishi

[11] Patent Number: 5,633,966
[45] Date of Patent: May 27, 1997

[54] METHOD OF FORMING REFRACTIVE INDEX DISTRIBUTION IN LIGHT TRANSMISSION PATH, AND OPTICAL FILTER AND METHOD OF USING THE SAME

[75] Inventor: Hiroyuki Nakaishi, Osaka, Japan

[73] Assignee: Sumitomo Electric Industries, Ltd., Osaka, Japan

[21] Appl. No.: 593,033

[22] Filed: Feb. 23, 1996

[30] Foreign Application Priority Data

Apr. 7, 1995 [JP] Japan .................. 7-082360
Nov. 7, 1995 [JP] Japan .................. 7-288396

[51] Int. Cl.$^6$ .............. G02B 6/34; G02B 5/18; B05D 5/06; G03G 15/00
[52] U.S. Cl. .............. 385/37; 385/123; 385/131; 385/14; 385/147; 427/163.2; 427/164; 359/566; 359/569; 430/4; 430/5; 430/56; 430/57
[58] Field of Search ............... 385/14, 15, 31, 385/37, 39, 51, 131, 147, 123; 359/566, 569, 576, 563; 427/163.2, 164, 165; 430/4, 5, 56, 57, 135

[56] References Cited

U.S. PATENT DOCUMENTS

| | | | |
|---|---|---|---|
| 4,400,056 | 8/1983 | Cielo | 385/37 X |
| 5,042,898 | 8/1991 | Morey et al. | 385/37 |
| 5,048,913 | 9/1991 | Glenn et al. | 385/37 |
| 5,066,133 | 11/1991 | Brienza | 359/570 |
| 5,104,209 | 4/1992 | Hill et al. | 385/27 |
| 5,388,173 | 2/1995 | Glenn | 385/37 |
| 5,502,786 | 3/1996 | Inniss et al. | 385/123 |

FOREIGN PATENT DOCUMENTS 0379358 7/1990 European Pat. Off. ........ 385/37 X

*Primary Examiner*—Brian Healy
*Attorney, Agent, or Firm*—W. G. Fasse; W. F. Fasse

[57] ABSTRACT

A method of forming a refractive index distribution in a light transmission path including a core and a cladding layer involves steps of applying a photosensitive material layer to the surface of the cladding layer, forming a mask pattern of the photosensitive material layer through photolithography, and irradiating the light transmission path with an electromagnetic wave having a wavelength not exceeding that of visible light and especially a wavelength of X-rays; through the mask pattern, thereby forming in the core a refractive index fluctuation distribution corresponding to the mask pattern.

46 Claims, 5 Drawing Sheets

METHOD OF FORMING REFRACTIVE INDEX DISTRIBUTION IN LIGHT TRANSMISSION PATH, AND OPTICAL FILTER AND METHOD OF USING THE SAME

BACKGROUND OF THE INVENTION

1. Field of the Invention

The present invention relates to a method of controlling the characteristics of a light transmission path such as an optical fiber member or a plane waveguide path which is used in an optical communication device or the like, and an optical filter. More particularly, the invention relates to a method of forming a refractive index distribution in a light transmission path for controlling its transmission and reflection characteristics, and an optical filter having characteristics which can be dynamically controlled.

2. Description of the Background Art

In order to form a grating by a permanent fluctuation distribution of a refractive index in a silica optical fiber member for controlling its transmission and reflection characteristics, in general the interference or diffraction of a laser beam has been utilized heretofore. Alternatively, a grating of a permanent refractive index distribution has been formed by intermittently moving an optical fiber member which is irradiated with a laser beam while limiting a region irradiated with the laser beam through a slit.

FIGS. 4A to 4C schematically illustrate an exemplary method of forming a permanent refractive index distribution in an optical fiber member through interference of a laser beam. Referring to FIG. 4A, a silica optical fiber member 10 includes a core 1 which is doped with Ge and a clad layer 2 covering the core 1. An ultraviolet laser beam 21 is divided into a pair of laser beams 21a and 21b by a beam splitter (half mirror) 22. The respective laser beams 21a and 21b are reflected by total reflection mirrors 23a and 23b, to interfere with each other at the position of the core 1. Namely, the interfering light has an intensity distribution which periodically fluctuates along the longitudinal direction of the core 1, so that a permanent grating 1a having a refractive index periodically fluctuating along the longitudinal direction of the core 1 is formed by interaction between the interfering light and the Ge material of the core.

When light L is incident upon the optical fiber member 10 including the periodic permanent refractive index fluctuation distribution 1a, a partial light component La which is included in the light L is reflected by the grating 1a, so that only the remaining partial light component Lb passes through the grating 1a. FIGS. 4B and 4C are graphs showing the relations between wavelengths λ and intensity values I in the partial light components La and Lb respectively. Namely, the permanent grating 1a reflects only the light component La of a specific wavelength in the incident light L, and can serve as a kind of filter.

FIG. 5 schematically illustrates an exemplary method of forming a permanent refractive index distribution in an optical fiber member through a slit. In the method shown in FIG. 5, an optical fiber member 10 including a core 1 and a clad layer 2 is partially shielded by a pair of slit masks 30a and 30b. The optical fiber member 10 is irradiated with an ultraviolet laser beam which is expressed by arrow 32 through a slit 31 between the slit masks 30a and 30b. At this time, the ultraviolet laser beam 32 has a direction of polarization which is parallel to the slit 31, as shown by arrow 33. Due to such irradiation with the ultraviolet laser beam 32, a permanent high refractive region is formed in the core 1 of the optical fiber member 10 in correspondence to the slit 31. Therefore, a permanent refractive index distribution can be formed similarly to the grating 1a shown in FIG. 4A, by intermittently moving the optical fiber member 10 along its longitudinal direction, as shown by arrow 11.

In the method utilizing interference or diffraction of a laser beam included in the conventional methods of forming permanent refractive index distributions in optical fiber members, however, the optical fiber member must be irradiated with a laser beam for at least several tens of minutes in order to form a sufficient permanent refractive index distribution, and it is difficult to stably maintain an optical system for such a longtime for forming an interference or diffraction fringe with no influence by temperature change or external vibration. Namely, the optical system for forming an interference or diffraction fringe for forming a fine grating in the core of an optical fiber member requires fine control, which disadvantageously leads to inferior controllability in the process.

On the other hand, the method of forming a permanent refractive index distribution in an optical fiber member through a slit disadvantageously requires an enormous time for forming a grating including hundreds of periodic refractive index fluctuations, although this method does not require an optical system for forming an interference or diffraction fringe. As understood from FIG. 5, only a single refractive index fluctuation can be formed by single irradiation with a laser beam through the slit.

Further, an optical filter including a permanent refractive index distribution which is formed by the aforementioned conventional method is a static filter, and it is impossible to change its characteristics after formation of the filter, except for the central wavelength of transmitted light. In order to control the transmission property of a conventional optical filter system, therefore, the optical filter member which is inserted in a light transmission path is mechanically exchanged. Alternatively, mechanical force is applied to a filter forming a permanent periodic structure of a refractive index by irradiation with a laser beam, thereby changing the central wavelength of transmitted light. However, the former method has such problems that the speed of response is so slow that selectable spectra are definite, and high density packaging cannot be attained since a filter exchanger is large-sized. On the other hand, the latter method has such a problem that the speed of response is so slow that only the central wavelength of transmitted light is controllable.

SUMMARY OF THE INVENTION

In consideration of the aforementioned problems of the prior art, an object of the present invention is to provide a method which can form a refractive index distribution in a light transmission path with excellent controllability in a relatively short time.

Another object of the present invention is to provide a miniature optical filter allowing high density packaging, whose filter characteristics can be controlled at a high speed of response so that not only the central wavelength of transmitted light but the transmittance and the bandwidth can be dynamically changed, and a method of using the same.

According to an aspect of the present invention, a method of forming a refractive index distribution in a light transmission path comprises the steps of preparing a light transmission path including a core and a clad or cladding layer, applying a photosensitive material layer on the surface of the cladding layer, patterning the photosensitive material layer through photolithography thereby forming a mask pattern, and irradiating the light transmission path with an electromagnetic wave having a wavelength not exceeding that of visible light, thereby forming in the core a fluctuation distribution of a refractive index corresponding to the mask pattern.

According to another aspect of the present invention, a method of forming a refractive index distribution in a light transmission path comprises the steps of preparing a light transmission path including a core and a clad or cladding layer, applying a photosensitive material layer to the surface of the cladding layer, patterning the photosensitive material layer through photolithography for forming a first mask pattern, covering a surface part of the cladding layer exposed in the region of the first mask pattern with a metal layer, removing the first mask pattern for forming a second mask pattern consisting of the metal layer, and irradiating the light transmission path with an electromagnetic wave having a wavelength not exceeding that of visible light through the second mask pattern, thereby forming in the core a fluctuation distribution of a refractive index corresponding to the second mask pattern.

According to still another aspect of the present invention, a method of forming a refractive index distribution in a light transmission path comprises the steps of forming a metal layer on a support film, patterning the metal layer through photolithography thereby forming a mask film including the support film and the patterned metal layer pattern, arranging the mask film so that the metal layer pattern approximates the surface of a clad or cladding layer of a light transmission path including a core and the cladding layer and irradiating the light transmission path with an electromagnetic wave having a wavelength not exceeding that of visible light through the mask film, thereby forming in the core a fluctuation distribution of a refractive index corresponding to the metal layer pattern.

In the method of forming a refractive index distribution in a light transmission path according to the present invention, an optical mask corresponding to the refractive index fluctuation distribution to be formed in the light transmission path is directly formed on the outer surface of the light transmission path, or a previously formed plane mask is arranged in proximity to the outer surface of an optical fiber member, whereby a complicated optical system is not required for forming an interference or diffraction fringe unlike the prior art, and a long time is not required for forming a remaining permanent refractive index distribution, unlike the conventional method employing a slit, while the refractive index distribution can be dynamically controlled during irradiation with light by changing the intensity of the light or a region irradiated with the light. According to the present invention, further, it is not necessary to utilize interference or diffraction, whereby an X-ray having a higher efficiency of causing a refractive index change than ultraviolet light can be employed to enable formation of a permanent refractive index distribution in a shorter time, while the speed of response for dynamically controlling the refractive index distribution can be improved.

According to a further aspect of the present invention, an optical filter comprises a light transmission path including a core and a cladding layer, and a fringy shielding pattern which is periodically formed on the surface of the light transmission path.

According to a further aspect of the present invention, a method of using an optical filter including a fringy shielding pattern which is periodically formed on the surface of a light transmission path including a core and a cladding layer comprises the steps of irradiating the core with light through the shielding pattern for filtering light advancing in the light transmission path and adjusting at least either the intensity of the light or a region irradiated with the light thereby dynamically controlling the characteristics of the optical filter.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

FIGS. 1A to 1D and 2A to 2C are sectional views schematically illustrating a method of forming a refractive index distribution in a light transmission path according to an embodiment of the present invention. The light transmission path includes an optical fiber member or a plane waveguide path which is generally used for optical communication, while the application or use thereof is not necessarily restricted to this field. In short, the light transmission path may include a core part having a high refractive index and a clad part or cladding part of a surface layer having a lower refractive index than the core part.

Figure 1A:
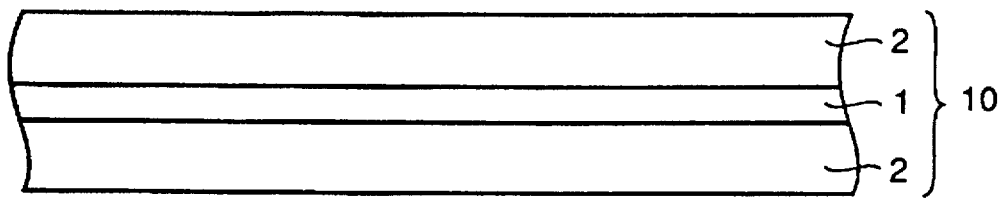
FIGS. 1A to 1D are sectional views schematically showing steps of a method of forming a refractive index distribution in an optical fiber member according to an embodiment of the present invention.

FIG. 1A shows an exemplary section along the longitudinal direction of an ordinary single mode optical fiber member. This optical fiber member 10 may be made of silica materials and; includes a core 1 and a clad or cladding layer 2 covering the core 1. In general, the core 1 has a sectional diameter of 10 μm, and the cladding layer 2 has a thickness of 57.5 μm. Namely, the optical fiber member 10 has an outer diameter of 125 μm.

Figure 1B:
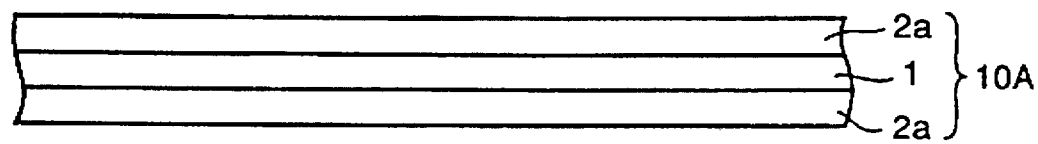

Referring to FIG. 1B, the clad layer 2 is worked into a clad layer 2a of not more than 50 μm in thickness with aqueous hydrofluoric acid. This process is desirable for improving the efficiency of reaction between an electromagnetic wave which is applied later and the core 1. When a strong electromagnetic wave is employed, therefore, the clad layer 2 does not necessarily need to be reduced in thickness.

While the clad layer 2a is preferably reduced in thickness in order to improve the reaction efficiency between the applied electromagnetic wave and the core 1, the light transmission loss of the optical fiber member 10 is increased if the clad layer 2a is extremely reduced in thickness. Therefore, the clad layer 2a preferably has a thickness of at least 10 μm. In a concrete Example, an optical fiber member 10 having an outer diameter of 125 μm was dipped in 50% aqueous hydrofluoric acid for 20 minutes, and worked into an optical fiber member 10A of 50 μm in outer diameter. Namely, the clad layer 2a of the optical fiber member 10A has a thickness of 20 μm.

Figure 1C:
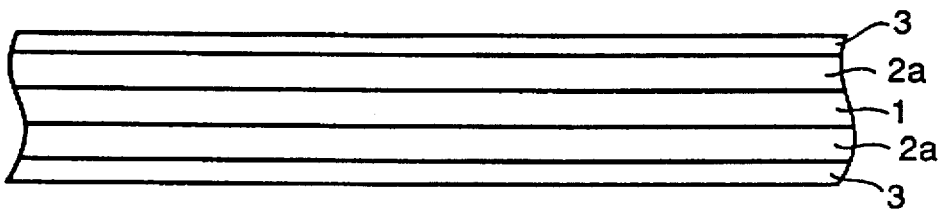

Referring to FIG. 1C, a photosensitive material layer 3 is applied onto the surface of the clad layer 2a which has been reduced in thickness. The material for the photosensitive material layer 3 can be selected from various materials, such as PMMA (polymethyl methacrylate) which is photosensitive resin, for example. In a concrete Example and preferably has a thickness of at least 0.1 μm, PMMA was applied in a thickness of 1 μm, dried and thereafter heated in the air to 170° C. and maintained in this state for 30 minutes, in order to form the photosensitive material layer 3.

Figure 1D:
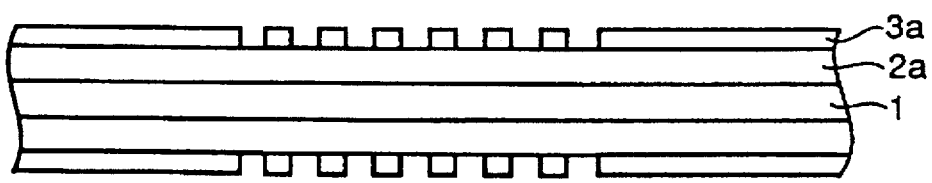

Referring to FIG. 1D, the PMMA layer 3 is worked into a resin mask pattern 3a including a groove pattern having a period of 0.5 μm through well-known photolithography. A refractive index distribution can be formed in the core 1 by transversely irradiating the optical fiber member 10A with an electromagnetic wave through the resin mask pattern 3a. In consideration of shielding performance with respect to the electromagnetic wave, however, the resin mask pattern 3a is preferably replaced with a metal mask pattern, as described below.

Figure 2A:
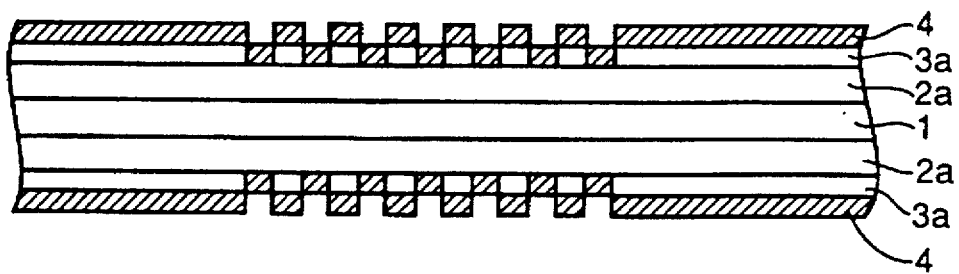
FIGS. 2A to 2C are sectional views schematically showing steps following that of FIG. 1D.

Referring to FIG. 2A, at least the clad layer surface which is exposed through the resin mask pattern 3a is covered with a metal layer 4. The metal layer 4 can be made of W, Ta or the like and preferably has a thickness of at least 0.01 μm. In a concrete Example, a thin film of W having a thickness of 0.3 μm was formed by vacuum deposition. In this case, the resin mask pattern 3a itself is also covered with the W thin film 4.

Figure 2B:
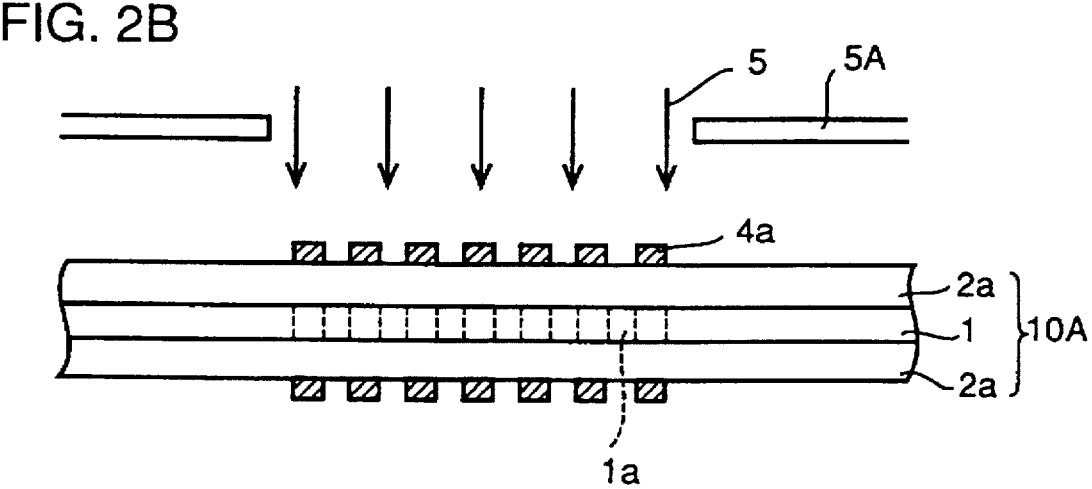

Referring to FIG. 2B, the resin mask pattern 3a is removed, whereby the portion of the W thin film 4 covering the resin mask pattern 3a is removed by a lift-off method, while leaving a metal mask pattern 4a. In this state, the optical fiber member 10A is transversely irradiated with an electromagnetic wave through a slit 5A as shown by arrows 5, whereby a refractive index fluctuation distribution 1a corresponding to the metal mask pattern 4a is formed in the core 1. In this case, the core 1 is directly irradiated with the electromagnetic wave through the metal mask pattern 4a without needing to form an interference or diffraction fringe of the electromagnetic wave, and hence the electromagnetic wave can be prepared may not only be visible light or ultraviolet radiation, but may also be an X-ray having a high efficiency of causing a refractive index change. In a concrete Example, the refractive index for light of a specific wavelength by the formed permanent refractive index distribution 1a was increased with an increase of the irradiation time, to form a narrow-band reflection filter in about 30 seconds when core 1 was irradiated with an X-ray through the W mask pattern 4a of 0.3 μm.

Figure 2C:
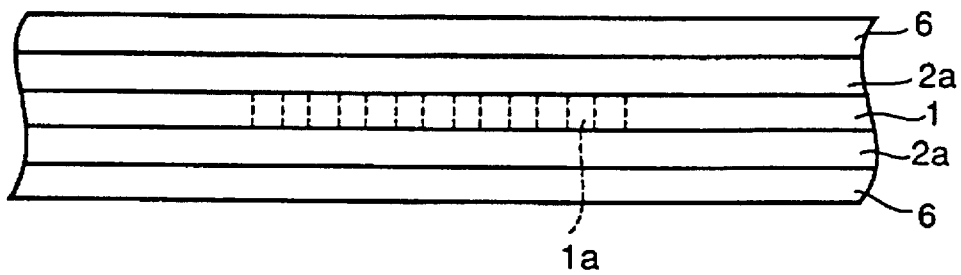

Finally with reference to FIG. 2C, the clad layer 2a is preferably covered with a flexible reinforcing resin layer 6. This flexible resin layer 6 is adapted to reinforce the mechanical strength of the thinned optical fiber member 10A, and can be formed by applying an ultraviolet setting resin and hardening the same by irradiation with ultraviolet radiation from an UV lamp or the like, for example. While the reinforcing resin layer 6 is applied after removal of the metal mask pattern 4a in FIG. 2C, the layer 6 may alternatively be applied while leaving the metal mask pattern 4a in place.

FIGS. 3A to 3D are sectional views schematically illustrating a method of forming a refractive index distribution in an optical fiber member according to another embodiment of the present invention.

Figure 3A:
FIGS. 3A to 3D are sectional views schematically showing a method of forming a refractive index distribution in an optical fiber member according to another embodiment of the present invention.

Referring to FIG. 3A, a metal layer 8 consisting of W, Ta or the like and preferably having a thickness of at least 0.01 μm, is deposited on a support film 7 consisting of a carbon film, a silicon nitride film or a silicon carbide film by sputtering, for example has a thickness of not more than 100 μm.

Figure 3B:
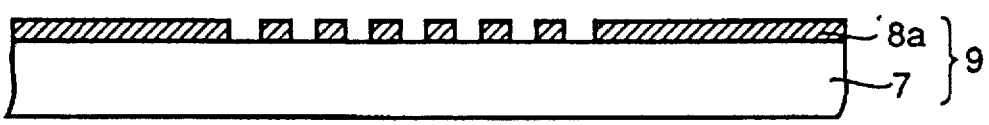

Referring to FIG. 3B, the metal layer 8 is worked into a metal mask pattern 8a including a periodic groove pattern through well-known photolithography, thereby forming a mask film 9.

Figure 3C:
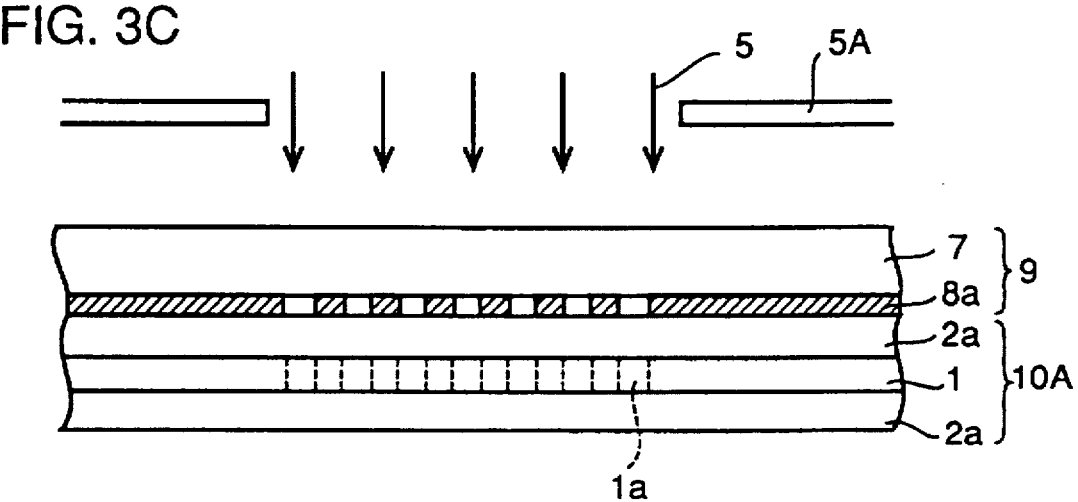

Referring to FIG. 3C, the mask film 9 is so arranged that the metal layer pattern 8a approximates or is moved close or adjacent to an optical fiber member 10A. The optical fiber member 10A includes a core 1 and a thinned clad layer 2a. In this state, a permanent refractive index fluctuation distribution 1a corresponding to the metal layer pattern 8a can be formed in the core 1 by irradiating the core 1 with an electromagnetic wave expressed by arrows 5 through a slit 5A and the mask film 9.

Figure 3D:
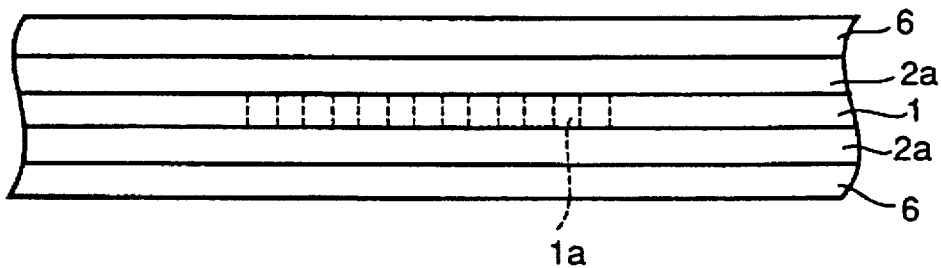
Figures 4A, 4B, 4C:
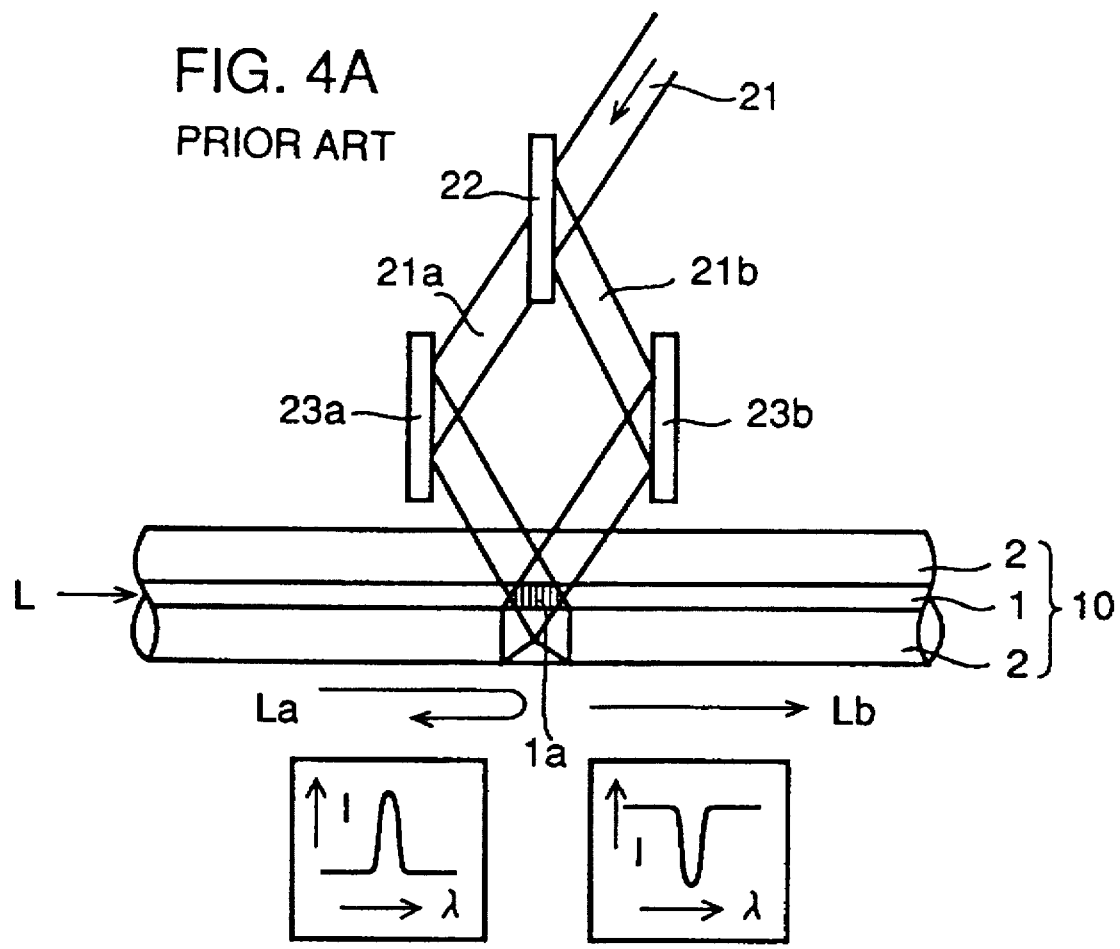
FIGS. 4A to 4C schematically illustrate a conventional method of forming a refractive index distribution in an optical fiber member through an interference fringe caused by a laser beam.
Figure 5:
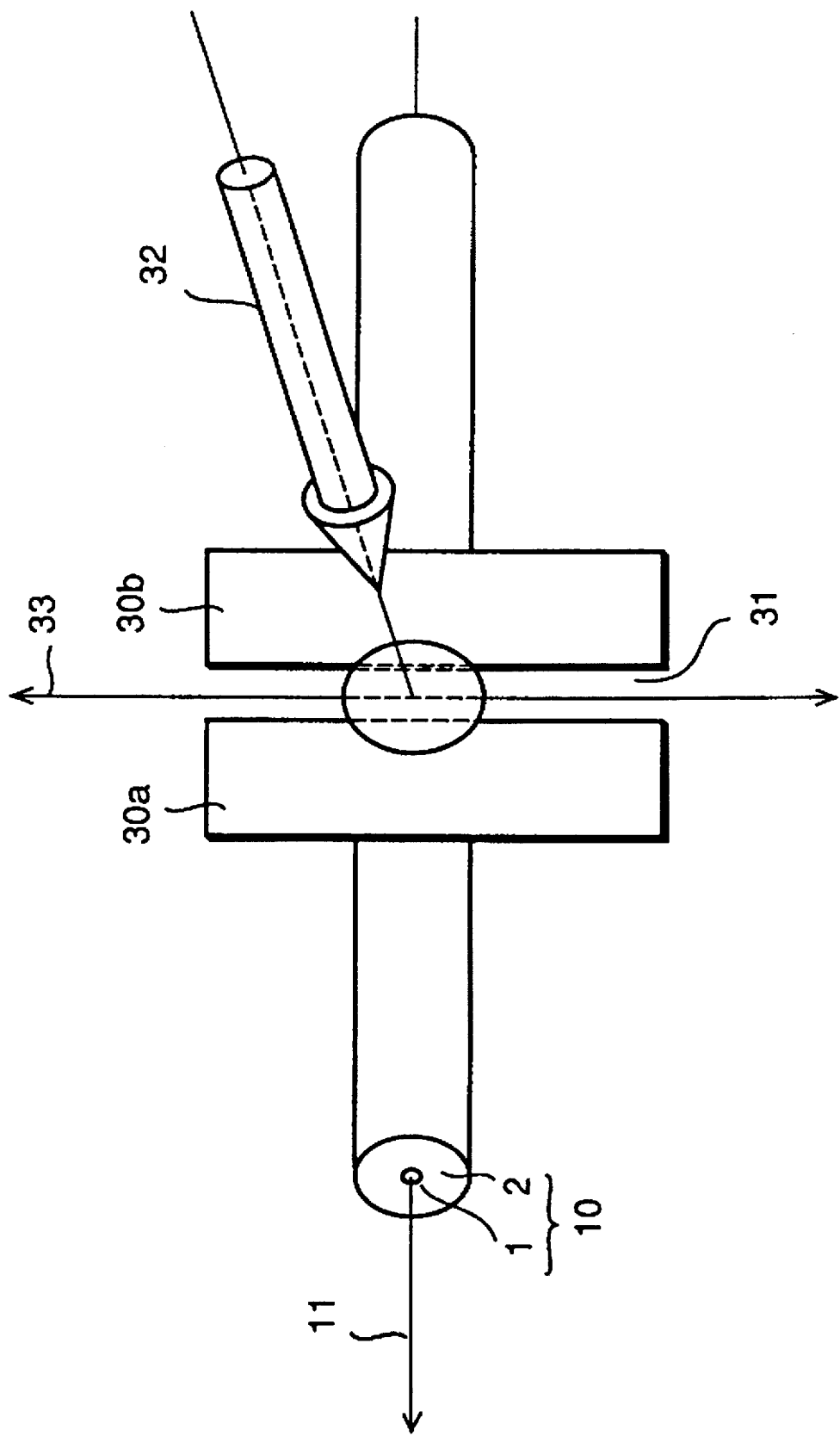
FIG. 5 schematically illustrates a conventional method of forming a refractive index distribution in an optical fiber member using a laser beam projected through a slit.

Finally with reference to FIG. 3D, the thinned clad layer 2a is covered with a flexible reinforcing resin layer 6, preferably similarly to that shown in FIG. 2C.

The inventor has first found that an extremely larger refractive index change is caused in the core 1 during irradiation with light 5 as shown in FIG. 2B or 3C, as compared with the permanent refractive index change remaining in the core 1 after the irradiation with the light 5 is completed. For example, it has been recognized that the refractive index change which is caused in the core 1 during irradiation with light 5 of high intensity can reach about 10 times the refractive index which can permanently remain in the core 1 after removal of the light 5. It has also been recognized that the refractive index change in the core 1 can be dynamically changed in response to the light intensity by changing the intensity of the light 5 during the irradiation therewith.

Namely, a light transmission path comprising a periodic fringy shielding pattern on its surface as shown in FIG. 2B or FIG. 3C can be employed as an optical filter whose control transmission characteristics can be dynamically controlled.

As a concrete Example of such an optical filter, a periodic tungsten shielding pattern 4a at a pitch of 0.5 μm was formed by X-ray lithography through steps similar to those shown in FIGS. 1A to 1C and 2A and 2B. The optical filter shown in FIG. 2B having such a shielding pattern 4a was irradiated with a semiconductor laser beam 5 having a wavelength of 0.65 μm. During the irradiation with the laser beam 5, the transmission attenuation factor of the optical filter was controllable by adjusting the intensity of the laser beam 5, while the bandwidth of the transmitted light was controllable in the range of 0.5 nm to 60 nm by adjusting the slit 5A shown in FIG. 2B and changing the length of the region irradiated with the laser beam 5. Further, it was possible to control the central wavelength of the transmitted light in the range of 1.2 μm to 1.7 μm by applying mechanical force to the optical filter.

According to the present invention, as hereinabove described, it is possible not only to provide a method which can form static and dynamic refractive index distributions in a light transmission path with excellent controllability in a short time, but also to provide an optical filter whose transmission characteristics can be dynamically controlled, and to provide a method of using the same.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of forming a refractive index distribution in a light transmission path, comprising the steps of:
   preparing a light transmission path including a core and a cladding layer;
   applying a photosensitive material layer onto a surface of said cladding layer;
   patterning said photosensitive material layer by photolithography thereby forming a mask pattern; and
   irradiating said light transmission path with an X-ray through said mask pattern, thereby forming in said core a refractive index fluctuation distribution corresponding to said mask pattern.

2. The method in accordance with claim 1, wherein said refractive index fluctuation distribution as formed exists and remains unchanged as a permanent refractive index fluctuation distribution after said irradiation with said X-ray is completed.

3. The method in accordance with claim 1, further comprising dynamically changing said refractive index fluctuation distribution as formed in response to changing at least either an intensity of said X-ray or a length of an irradiated region of said light transmission path during said irradiation with said X-ray.

4. The method in accordance with claim 1, wherein said photosensitive material layer consists of PMMA.

5. The method in accordance with claim 4, wherein said photosensitive material layer has a thickness of at least 0.1 µm.

6. The method in accordance with claim 1, further comprising reducing a thickness of said cladding layer to a thickness of not more than 50 µm before said irradiation with said X-ray.

7. The method in accordance with claim 6, further comprising covering an outermost surface of said light transmission path with a flexible reinforcing film after said irradiation with said X-ray.

8. The method in accordance with claim 7, wherein said reinforcing film is formed by ultraviolet setting resin.

9. The method in accordance with claim 1, wherein said light transmission path is selected from the group consisting of an optical fiber member and a plane waveguide path.

10. The method in accordance with claim 1, wherein said core and said cladding layer are made of silica materials.

11. A method of forming a refractive index distribution in a light transmission path, comprising the steps of:
    preparing a light transmission path including a core and a cladding layer;
    applying a photosensitive material layer onto a surface of said cladding layer;
    patterning said photosensitive material layer by photolithography thereby forming a first mask pattern;
    covering a portion of said surface of said cladding layer that is exposed in a region of said first mask pattern with a metal layer;
    removing said first mask pattern for forming a second mask pattern consisting of said metal layer; and
    irradiating said light transmission path with an electromagnetic wave having a wavelength not exceeding that of visible light through said second mask pattern, thereby forming in said core a refractive index fluctuation distribution corresponding to said second mask pattern.

12. The method in accordance with claim 11, wherein said refractive index fluctuation distribution as formed exists and remains unchanged as a permanent refractive index fluctuation distribution after said irradiation with said electromagnetic wave is completed.

13. The method in accordance with claim 11, further comprising dynamically changing said refractive index fluctuation distribution as formed, in response to changing at least either an intensity of said electromagnetic wave or a length of an irradiated region of said light transmission path during said irradiation with said electromagnetic wave.

14. The method in accordance with claim 11, further comprising removing said second mask pattern after said irradiation with said electromagnetic wave.

15. The method in accordance with claim 11, wherein said photosensitive material layer consists of PMMA.

16. The method in accordance with claim 15, wherein said photosensitive material layer has a thickness of at least 0.1 µm.

17. The method in accordance with claim 11, wherein said metal layer contains a metal selected from the group consisting of W and Ta.

18. The method in accordance with claim 17, wherein said metal layer has a thickness of at least 0.01 µm.

19. The method in accordance with claim 11, wherein said electromagnetic wave includes an electromagnetic radiation selected from the group consisting of X-ray and ultraviolet radiation.

20. The method in accordance with claim 11, further comprising reducing a thickness of said cladding layer to a thickness of not more than 50 µm before said irradiation with said electromagnetic wave.

21. The method in accordance with claim 20, further comprising covering an outermost surface of said light transmission path with a flexible reinforcing film after said irradiation with said electromagnetic wave.

22. The method in accordance with claim 21, wherein said reinforcing film is formed by ultraviolet setting resin.

23. The method in accordance with claim 11, wherein said light transmission path is selected from the group consisting of an optical fiber member and a plane waveguide path.

24. The method in accordance with claim 11, wherein said core and said cladding layer are made of silica materials.

25. A method of forming a refractive index distribution in a light transmission path including a core and a cladding layer, comprising the steps of:
    forming a metal layer on a support film;
    patterning said metal layer to form a patterned metal layer pattern by photolithography, thereby forming a mask film including said support film and said patterned metal layer pattern;
    arranging said mask film so that said metal layer pattern approximates a surface of said cladding layer of said light transmission path; and
    irradiating said light transmission path with an X-ray through said mask film thereby forming in said core a refractive index fluctuation distribution corresponding to said metal layer pattern.

26. The method in accordance with claim 25, wherein said refractive index fluctuation distribution as formed exists and remains unchanged as a permanent refractive index fluctuation distribution after said irradiation with said X-ray is completed.

27. The method in accordance with claim 25, further comprising dynamically changing said refractive index fluctuation distribution as formed, in response to changing at least either an intensity of said X-ray or a length of an irradiated region of said light transmission path during said irradiation with said X-ray.

28. The method in accordance with claim 25, wherein said support film includes a film selected from the group consisting of a carbon film, a silicon nitride film, and a silicon carbide film.

29. The method in accordance with claim 28, wherein said support film has a thickness of not more than 100 μm.

30. The method in accordance with claim 25, wherein said metal layer contains a metal selected from the group consisting of W and Ta.

31. The method in accordance with claim 30, wherein said metal layer has a thickness of at least 0.01 μm.

32. The method in accordance with claim 26, further comprising reducing a thickness of said cladding layer to a thickness of not more than 50 μm before said irradiation with said X-ray.

33. The method in accordance with claim 32, further comprising covering an outermost surface of said light transmission path with a flexible reinforcing film after said irradiation with said X-ray.

34. The method in accordance with claim 33, wherein said reinforcing film is formed by ultraviolet setting resin.

35. The method in accordance with claim 25, wherein said light transmission path is selected from the group consisting of an optical fiber member and a plane waveguide path.

36. The method in accordance with claim 25, wherein said core and said cladding layer are made of silica materials.

37. An optical filter comprising:

a light transmission path including a core and a cladding layer, wherein said cladding layer has a thickness of not more than 50 μm; and a fringy shielding pattern arranged periodically on a surface of said light transmission path.

38. The optical filter in accordance with claim 37, wherein said shielding pattern includes at least one member selected from the group consisting of a resist layer and a metal layer.

39. The optical filter in accordance with claim 37, wherein said fringy shielding pattern has a period within a range of 0.2 μm to 1 μm.

40. The optical filter in accordance with claim 38, wherein said shielding pattern has such a structure that it can shield light having a wavelength of not more than 1.6 μm.

41. The optical filter in accordance with claim 37, wherein said light transmission path is selected from the group consisting of an optical fiber member and a plane waveguide path.

42. The optical filter in accordance with claim 37, wherein said core and said cladding layer are made of silica materials.

43. A method of using an optical filter including a light transmission path having a core and a cladding layer, and a fringy shielding pattern periodically arranged on a surface of said light transmission path, comprising the steps of:

irradiating an irradiated region of said core with an X-ray having an X-ray intensity through said shielding pattern while simultaneously transmitting and filtering light in said light transmission path; and adjusting at least either said X-ray intensity or a length of said irradiated region thereby dynamically controlling a filter characteristic of said optical filter.

44. The method in accordance with claim 43, wherein said adjusting step comprises adjusting said X-ray intensity thereby dynamically controlling said filter characteristic, which comprises a transmission attenuation factor of said filter.

45. The method in accordance with claim 43, wherein said adjusting step comprises adjusting said length of said irradiated region thereby controlling said filter characteristic, which comprises a bandwidth of said light being transmitted and filtered through said light transmission path.

46. The method in accordance with claim 43, further comprising applying a mechanical force to said filter and adjusting said mechanical force for controlling a central wavelength of said light being transmitted and filtered through said light transmission path.

* * * * *

UNITED STATES PATENT AND TRADEMARK OFFICE
CERTIFICATE OF CORRECTION

PATENT NO. : 5,633,966
DATED : May 27, 1997
INVENTOR(S) : Nakaishi

It is certified that error appears in the above-identified patent and that said Letters Patent is hereby corrected as shown below:

```
Col. 2, line 13, replace "longtime" by --long time--.
Col. 4, line 33, delete ";";
        line 52, delete ";".
Col. 5, line 14, after "for example" insert --and preferably
                 has a thickness of at least 0.1 μm.--,
                 delete "and prefer-";
        line 15, delete "ably has a thickness of at least 0.1 μm.";
        line 23, after "pattern 3a" insert --.--;
        line 24, delete ".";
        line 48, delete "can be prepared".
Col. 6, line  9, after "for example" insert --, which preferably--.
Claim 32, (col. 9), line 18, replace "claim 26" by --claim 25--.
```

Signed and Sealed this

Sixteenth Day of September, 1997

Attest:

BRUCE LEHMAN

*Attesting Officer*      *Commissioner of Patents and Trademarks*